United States Patent [19]

Alafandi et al.

[11] 4,198,321

[45] Apr. 15, 1980

[54] HYDROPROCESSING CATALYSTS

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 857,394

[22] Filed: Dec. 5, 1977

Related U.S. Application Data

[63] Continuation-in-part of Ser. No. 808,268, Jun. 20, 1977, Pat. No. 4,164,483, which is a continuation-in-part of Ser. No. 718,166, Aug. 27, 1976, Pat. No. 4,085,069, which is a continuation-in-part of Ser. No. 718,167, Aug. 27, 1976, Pat. No. 4,058,484.

[51] Int. Cl.$^2$ .................... B01J 29/04; B01J 29/08
[52] U.S. Cl. ................................................ 252/455 Z
[58] Field of Search ..................... 252/455Z; 423/112

[56] References Cited

U.S. PATENT DOCUMENTS

| | | | |
|---|---|---|---|
| 3,375,065 | 3/1968 | McDaniel et al. | 252/455 Z |
| 3,405,055 | 10/1968 | Bittner | 252/455 Z |
| 3,449,070 | 6/1969 | McDaniel et al. | 252/455 Z |

*Primary Examiner*—Carl F. Dees
*Attorney, Agent, or Firm*—Philip Subkow; Bernard Kriegel

[57] ABSTRACT

This invention relates to a hydroprocessing catalyst particularly useful in hydrocracking comprising a low sodium faujasite zeolite produced by a high pressure exchange of Na cations with a solution of an ammonium salt as a substrate for incorporation of a hydrogenating metal compound.

10 Claims, No Drawings

HYDROPROCESSING CATALYSTS

This application is a continuation-in-part of application serial number 808,268, filed June 20, 1977 now U.S. Pat. No. 4,164,483, which is in turn a continuation-in-part of application Ser. No. 718,166, filed Aug. 27, 1976 now U.S. Pat. No. 4,085,069, and application Ser. No. 718,167, now U.S. Pat. No. 4,058,484.

This invention relates to a hydroprocessing catalyst and to processes employing the same and is particularly directed to a hydrocracking catalyst and processes of hydrocracking employing the same.

Combinations of exchanged zerolites with hydrogenation catalysts including those useful in hydrotreating processes, e.g. hydrocracking, hydrofining, hydrodenitrogenation, hydrodesulfurization and other reactions in which hydrogen modifies the reaction of hydrocarbons catalyzed by the aforesaid catalysts are well known in the art. Such processes are described by Rabo, "Zerolite Chemistry" and Catalysis a CS monograph 171. See Also Choundhary and Saraf, "Hydrocracking: A review" Ind. and Eng. Chem. Prod. Rev. Dev. Volume 14, No. 2, 1976 pp. 74–83. One of the problems in such processes especially where water vapor at high temperatures is present either as a product of the reaction or in the regeneration stage of the system, is the hydrothermal instability of the zeolite forming part of the catalyst.

It has been shown in the prior art that the hydrothermal stability of the zeolites and particularly that of the zeolites of the faujasite type, known generally as Y zeolites, may be substantially improved and thus made useful as hydrotreating catalysts, by reducing the sodium content of the zeolite to less than about 1%, preferably to about 0.5% and less percentage expressed as $Na_2O$ by exchange with an ion other than an alkali metal cation.

The zeolite after exchange, is then combined with a hydrogenation catalyst and may be combined with a matrix. Depending on the hydrotreating process, various catalytic metals, catalytic metal oxides or sulfides may be used. The literature is extensive and the following is a sampling which may be useful in placing our invention in its historical perspective.

The art prior to our invention as described in our invention, U.S. Pat. No. 4,058,484, related to two characteristically similar procedures for reducing the sodium content to produce a composition of improved hydrothermal stability. In both procedures the high sodium Y zeolite is exchanged at ordinary temperatures to reduce the sodium content to the range of about 2% expressed as $Na_2O$. It is then calcined and re-exchanged to reduce the sodium to less than 1% for example, 0.5% or less on a volatile-free basis. The calcination may be a dry calcination or a wet calcination in the presence of high-temperature steam. Such processes are described in Maher et al U.S. Pat. Nos. 3,293,192 and 3,402,990 and Ward U.S. Pat. No. 3,281,169. The use of stabilized faujasite zeolites together with hydrogenation components is described in the prior art, for example Wright U.S. Pat. No. 3,923,640 and Ward U.S. Pat. No. 3,867,277.

We have in our co-pending application referred to above, described our discovery that; by exchanging the sodium zeolite under superatmospheric pressure under controlled conditions of temperature, pressure and pH and reactant ratios, produce a zeolite of low sodium content which has superior hydrothermal stability.

We may, by such procedures, both for X and Y zeolites, reduce the sodium content to 2.5% and less expressed as $Na_2O$ on a volatile-free basis and preferably less than 1% and down to 0.5% or less without any substantial alteration in the lattice structure or degree of crystallinity of the zeolite, under the controlled temperatures and reaction conditions as described above. The specification of the application Ser. No. 808,268, 718,167, and U.S. Pat. No. 4,058,484, are herewith incorporated into this application by this reference.

The process of the above applications and patents produces a faujasite zeolite having the characteristic $a_o$ values of the faujasites X and Y, depending on the source zeolite and of high thermal stability.

As described in said patent and application, the X and Y zeolites, when combined with a matrix, are superior cracking catalysts for example for use in fluid cracking. For this purpose, they are formed as microspheres by spray drying of the slurry of the exchanged zeolite and the matrix.

The exchanged zeolites described in said patent and application may be formed with a suitable matrix into pellets by standard extrusion, pelleting or tableting procedures.

For this purpose, the zeolite, matrix and water is of a composition suitable for this pelleting procedure. This is well known in the art. Such pellets are useful in fixed bed operations.

When so used, the catalyst is in a form suitable for fixed bed or moving bed cracking processes. We have found that such exchange zeolites, when combined with a hydrogenation catalyst, such as have been described in the prior art, have excellent activitites as hydrotreating catalysts. We have also found that these exchanged zeolites, when combined with a hydrogenation catalyst, are excellent hydrocracking catalysts. In the case of the hydrocracking reaction, our hydrocracking catalyst shows substantially higher catalytic activity than do the zeolitic catalysts of like sodium content of the prior art.

The low-sodium zeolites of our invention are preferably combined with matrixes and the hydrogenation catalysts such as have been described in the prior art for use in hydroprocessing reactions and are particularly useful in such hydrocracking reactions and may be formed into suitable shapes as described above.

The hydrocracking catalyst of our invention is substantially more active than catalysts employing prior art, low-sodium zeolites of like composition in that it produces a much more severe cracking under the same hydrocracking conditions. Our catalyst will convert substantially all the fractions present in a gas oil feed into gasoline fractions boiling below 421° F., whereas the catalysts of the prior art produce a product, a substantial part of which is in the range above 421° F. when subjected to the same hydrocracking and distillation procedures.

DETAILED STATEMENT OF THE INVENTION

The particular hydroprocessing catalyst which we prefer is one that is useful in hydrcracking.

The preferred hydrocracking catalyst is a Y faujasite zeolite containing hydrocracking catalyst in which the zeolite component is of the faujasite type in which the sodium content is less than about 1% and preferably about 0.5% or less of the zeolite expressed as $Na_2O$ on a volatile-free basis.

The exchanged cation in the Y zeolite may be any of the cations previously employed in forming the catalyst useful in the conventional catalytic cracking process, to wit ammonium, rare earth, calcium, magnesium, aluminum and chromium. The preferred cation for exchange of the sodium Y for use in the hydrocracking catalyst is ammonium, exchanged under the condition described in our patent.

The matrix may be any of those used in the prior art to combine with a zeolite to form suitable shapes. The matrix may be a kaolin, alumina, both in the crystalline form as gamma alumina, but preferably, as hydrated alumina such as bayerite, boehmite and preferably a pseudoboehmite. Other oxides or oxide mixtures such as silica gel, alvmina gel, titania both as anatase or titanium hydrate may also be used. The above matrixes may be as the sole matrix component or may be used in various combinations. For our hydrocracking catalyst, we prefer to use pseudoboehmite.

The zeolite component of the catalyst including the matrix on a volatile-free basis may be from about 5% to about 90% of the mixture, preferably about 70% to 80% of the combined zeolite and matrix. The mixture of zeolite and matrix may be formed into microspheres by spray drying. We may form the catalyst into a cylindrical or non-cylindrical form by extrusion through a die or the mixture may be formed into a spherical or other shape by well-known tableting or pilling techniques. All such forms are herein referred to as pellet. The pellet may be dried and calcined.

The zeolite may be combined with a hydrogenation catalyst prior to combining the same with a matrix. The zeolite may undergo further exchange with the cations referred to above. The moist mixture of the zeolite and matrix prior to forming into a pellet, may be combined with a hydrogenation metal compound and formed into a pellet. The pellet if not a microsphere, may be dried, and if a microsphere or any form of dried pellet, it may be calcined.

Instead of incorporating the hydrogenating metal compound into the moist mixture prior to pellet formation, the pellet may be treated after formation if a microsphere or after calcination if one or the other pellet forms. The calcined pellet is sprayed or otherwise mixed with a solution of the hydrogenation metal compound to incorporate it into the pellet. The moist pellet may then be dried. It may also be calcined. In such cases the metal compound may be converted into the oxide form. It may be sulfided by passing a sulfur containing petroleum hydrocarbon vapor over the hot catalyst. Such sulfiding procedures are well known in the prior art of hydrodesulfurization processes.

Our preferred procedure for incorporating the catalytic metal into the catalyst for use as a hydrocracking process is to cause an exchange of the ammonium cation with the catalytic metal cation.

The preferred zeolite is an ammonium zeolite made by exchanging a sodium Y (see for example U.S. Pat. No. 3,130,007) produced by the process of said patent or by other prior art processes in which kaolin is part of the source of the silica and alumina. Reference may be made to application Ser. No. 718,155 now Pat. No. 4,085,069 for further description of the process of producing such a sodium zeolite. Such prior art processes and others well known in the prior art will produce a sodium Y which is characterized by an $a_o$ which is substantially less than the $a_o$ of the original Y. The process of producing the ammonium Y which we prefer to employ is as described in said U.S. Pat. No. 4,059,494, and involves the exchange of sodium Y with ammonium salt solution at temperatures between about 300° F. and 500° F. preferably about 350° F. to 400° F. The equivalents of ammonium to the sodium in the Y in the reaction is above 5 and preferably in the range of about 30 to 40 equivalents of ammonium per equivalent of sodium in the sodium Y. The reaction mixture is adjusted for an acid environment and suitably in a pH of range of about 2.5 to about 5, for example 3 or 4 prior to subjecting it to the above exchange reaction. The product produced is an ammonium Y zeolite in which the crystallinity is substantially the same as that of the Na Y entering the exchange reaction with substantially the same X-ray structure, $a_o$ and $SiO_2$ to $Al_2O_3$ ratio.

Depending on the nature of the hydroprocessing procedure, we may combine the zeolite under conditions where the hydrogenation compound exchanges with the ammonium zeolite to introduce the catalytic metal ion into exchange position in the zeolite. This may occur prior to or subsequent to the pellet formation referred to above. This may result where the catalytic compound is added as a salt solution as in the case of the catalytic metals, which are combined with the zeolite in any of the above procedures. Where the catalytic metal compound is added as a solid, to be merely mixed with the zeolite and the matrix, the solid may be mixed with the zeolite and the matrix prior to formation either as a microsphere or as any other of the above forms of pellet.

The catalytic metals useful for hydroprocessing are well known in the prior art and include the groups VIB and group VIII metals which may be added as the oxide or sulfide or which may be converted into their oxides or sulfides.

Useful proportions of the group VIB or group VIII metals expressed as oxide and based on the catalyst including the matrix on a volatile-free basis may range from about 0.1% to about 30%.

As hydrocracking catalyst we prefer to employ the noble metals, platinum or palladium in the range of about 0.1 to about 5% expressed as metal and based on the zeolite component on a volatile-free basis. They are mixed as salt solutions with the zeolite in any of the above procedures whereby they may enter into exchange with the ammonium cation of the zeolite or otherwise be associated with the pellet components.

The catalyst of our invention employing the ammonium zeolite, hydrogenation catalyst and matrix is particularly useful in hydrocracking.

Hydrocracking processes are essentially catalytic cracking operations carried out in the presence of hydrogen, at high pressure at temperatures substantially lower than used in atmospheric catalytic cracking operations.

Such processes are well known and the conditions under which they are carried out are referred to as hydrocracking conditions. As used in this application, the term hydrocracking conditions is to be understood as those conventionally used for cracking of a hydrocarbon fraction in the presence of hydrogen at from 1000 to 2000 psi, and at temperatures of substantially less than 900° F., for example 700° to 850° F. The control of the pressure, temperature, hydrogen to oil ratio to obtain desirable cracking conditions are well known. The following example illustrates the preferred method of forming the ammonium Y for use in forming our hydrocracking catalyst.

EXAMPLE 1

The sodium Y charged to the exchange, analyzed as 14.1% $Na_2O$ on a volatile-free basis (VF), and a silica to alumina ratio of 4.4 and an $a_o$ of 24.67 was dispersed in 1400 ml of a solution containing 1400 grams of ammonium nitrate, anhydrous basis, equivalent to 13 equivalent of $NH_4$ ion per liter. The analytical results, as well as the $a_o$ lattice constant indicated that substantially all of the exchange sites were occupied by sodium.

The slurry contained 100 grams, volatile-free, of the above sodium Y (containing 0.455 equivalents of Na) to give a solids content of 6.6% and a ratio of equivalents of ammonium cation in the solution per equivalent of the sodium cation in the zeolite of 40. To this mixture was added sufficient nitric acid to bring the solution to a pH of 3.5. The mixture was heated in an autoclave under autogenous pressure to a temperature of 350° F. for six hours. The mixture after cooling was filtered and the solids were washed with distilled water substantially free of nitrate anions.

The exchange reduces the sodium to about 0.4% on a volatile-free basis. The filter cake analyzes as follows:

Volatile matter: 60.3%;
$SiO_2$: 29.1%;
$Al_2O_3$: 10.2%;
$Na_2O$: 0.17%;
$NH_3$: 3.08%;
$SO_4$: 0.15%.

By varying the ratios of the equivalents of ammonia to the sodium, and the time of reaction at the elevated temperatures in example 1, we may obtain variolevels of sodium in exchange faujasite as described in said patent.

As described in said applications and patent, we have found that we may obtain cracking catalysts of good hydrothermal stability as represented by resistance to high temperature steaming. The ammonium zeolite with $Na_2O$ contents ranging from about 2.5% to 0.5% on a volatile-free basis when combined with a matrix gave excellent cracking catalysts. Reference may be had to said co-pending application for further details.

We have found that the exchange zeolite produced as in example 1, when combined with a catalyst promoter chosen from the group of the noble metals, palladium, or platinum produced a highly-active hydrocracking catalyst.

EXAMPLE 2

The ammonium Y zeolite formulated as in example 1 was slurried in an ammoniacal solution at a pH of 9 with a palladium chloride solution, and held for one hour at ambient temperature to promote the exchange with the palladium. The mixture was filtered and the filter cake was washed free of chloride and dried. The dried filter cake contained palladium equal to 0.7% expressed as metal on a volatile-free basis.

This product was combined with pseudoboehmite which had been peptized with formic acid as is described in said co-pending application, and in a ratio of about 80% of the zeolite to 20% of the peptized alumina, on a volatile-free basis. The moisture content in the mixture was adjusted to an extrusion mix of about 55% to 65% moisture and extruded through a die to give pellets of a 1/16 inch diameter. The product was subjected to a hydrocracking operation.

EXAMPLE 3

The catalyst was heated in a tubular reactor mixed with twice its volume of quartz at a temperature of 770° F. Hydrogen and oil vapor were passed through the tower at 1400 psi pressure at an hourly space velocity (LHSV) of 1 at a hydrogen to oil ratio of 8,000 standard cubic feet per barrel of oil (SCH/B) for 12 hours. The oil was a West Texas high vacuum gas oil of 21.48 API gravity and having a distillation range as follows:

below 421° F. =0%;
421° F. to 650° F. =0.94%;
above 650° F. =99.05%;
sulfur content =2.12% by weight.

The collected distillate from the hydrocracker analyzed as follows:

below 421° F. =99.4%;
421° F. to 650° F. =0.06%;
above 650° F. =0%.

The sulfur content of the treated oil was 0.16%. The treated percent of the oil processed and collected as distillate was 99% by volume of the feed. It will be noted that substantially all of the components having boiling points above 650° F. have been converted into the lighter fraction, boiling under 421° F. The results may be compared with that using the prior art low-sodium zeolite having the following composition on a volatile-free basis:

$SiO_2$: 76.9%;
$Al_2O_3$: 22.3%;
$Na_2O$: 0.12 to 0.15%;
$(NH_4)_2O$: 3.86%.

This zeolite was treated as described in the example 2 to produce a zeolite containing 0.7% of palladium as metal on a volatile-free basis and processed by the hydrocracking procedure described above. The collected distillate from the hydrocracker, after 8 hours, and after 16 hours, is as follows:

| After 8 hours | | |
|---|---|---|
| below | 421° F. | 63.88% |
| 421° F. to | 650° F. | 9.16% |
| above | 650° F. | 21.2% |

The percent conversion was 78.8%.

| After 16 hours | | |
|---|---|---|
| below | 421° F. | 68.88% |
| 421° F. to | 650° F. | 9.22% |
| above | 650° F. | 26.9% |

The percent conversion was 73.1%.
The percent sulfur in the treated oil was 0.36%.

We claim:

1. A method of producing a cracking catalyst containing a zeolite of the faujasite type which comprises mixing a zeolite of the faujasite type whose exchange position is substantially entirely occupied by Na cations with a solution of an ammonium salt, the quantity of the zeolite, and the concentration of the ammonium cations, being in quantity sufficient to establish a ratio of the equivalents of $NH_4$ cation in the solution, per equivalent of Na cation in the zeolite in the mixture in excess of about 5, heating the solution at superatmospheric pressure to a temperature above about 300 and less than about 450° F. for a period of time to reduce the sodium content of the zeolite, expressed as $Na_2O$, in the range of from about 1% to about 0.5% by weight of the exchanged zeolite, on a volatile free basis, and washing the zeolite with water until the wash water is substantially free of anions of the ammonium salt in solution, mixing said exchanged zeolite with a water solution of a hydrogenating metal compound and separating water from the zeolite.

2. The process of claim 1 in which the compound is a salt of platinum or palladium.

3. The process of claim 2 in which the compound is added to the zeolite prior to forming of the pellet.

4. The process of claim 2 in which the pellet is calcined and then a solution of the metal is added to the calcined pellet.

5. A cracking catalyst produced by the process which comprises mixing a zeolite of the Y type whose exchange position is substantially entirely occupied by Na cations with a solution of an ammonium salt, the quantity of the zeolite, and the concentration of the ammonium cations, being in quantity sufficient to establish a ratio of the equivalents of $NH_4$ cation in the solution, per equivalent of Na cation in the zeolite in the mixture in excess of about 5, heating the solution at superatmospheric pressure to a temperature above about 300° F. and less than about 450° F. for a period of time to reduce the sodium content of the zeolite, expressed as $Na_2O$, to the range of less than 1% by weight of the exchanged zeolite, on a volatile free basis, and washing the zeolite substantially free of anions of the salt in solution, mixing said zeolite with a matrix and water and forming said mixture into a pellet and mixing said pellet with a water solution of a hydrogenating metal compound and separating water from said pellet.

6. The catalyst of claim 5 in which the pellet is calcined.

7. The catalyst of claim 5 in which the ammonium zeolite is contacted with a solution of a salt of a hydrogenating metal salt.

8. The catalyst of claim 7 in which the hydrogenating metal is palladium or platinum.

9. The catalyst of claim 6 in which the calcined pellet is contacted with a salt of a hydrogenating metal salt.

10. The catalyst of claim 9 in which the hydrogenating metal is palladium or platinum.

* * * * *